(12) United States Patent
Burckart et al.

(10) Patent No.: US 9,503,498 B2
(45) Date of Patent: *Nov. 22, 2016

(54) WEB PAGE SCRIPT MANAGEMENT

(75) Inventors: Erik John Burckart, Raleigh, NC (US); Robert Madey, Jr., Austin, TX (US); Victor S. Moore, Lake City, FL (US); Joseph Wham Ziskin, Westport, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 941 days.

This patent is subject to a terminal disclaimer.

(21) Appl. No.: 13/248,615

(22) Filed: Sep. 29, 2011

(65) Prior Publication Data

US 2013/0086247 A1 Apr. 4, 2013

(51) Int. Cl.
*G06F 9/50* (2006.01)
*H04L 29/08* (2006.01)
*G06F 15/167* (2006.01)
*G06F 11/34* (2006.01)
*H04L 29/06* (2006.01)

(52) U.S. Cl.
CPC ............. *H04L 67/02* (2013.01); *G06F 9/5083* (2013.01); *G06F 9/5088* (2013.01); *G06F 11/3404* (2013.01); *G06F 15/167* (2013.01); *H04L 67/22* (2013.01); *H04L 67/2823* (2013.01); *H04L 67/2828* (2013.01); *H04L 67/42* (2013.01)

(58) Field of Classification Search
CPC .. G06F 9/5088; G06F 9/5083; G06F 15/167; G06F 11/3404

USPC .......... 709/214, 203, 224; 715/234; 707/709
See application file for complete search history.

(56) References Cited

U.S. PATENT DOCUMENTS

| | | |
|---|---|---|
| 6,430,624 B1 | 8/2002 | Jamtgaard et al. |
| 2008/0275980 A1 | 11/2008 | Hansen |
| 2009/0216882 A1* | 8/2009 | Britton et al. ................ 709/224 |
| 2009/0260087 A1 | 10/2009 | Ishida et al. |
| 2010/0114864 A1* | 5/2010 | Agam et al. .................. 707/709 |
| 2010/0146383 A1 | 6/2010 | Kim et al. |
| 2011/0029899 A1 | 2/2011 | Fainberg et al. |
| 2011/0035486 A1 | 2/2011 | Seolas et al. |
| 2011/0055683 A1* | 3/2011 | Jiang ............................ 715/234 |
| 2011/0314091 A1* | 12/2011 | Podjarny ...................... 709/203 |
| 2012/0079057 A1* | 3/2012 | Fainberg et al. ............ 709/214 |
| 2013/0086247 A1* | 4/2013 | Burckart et al. ............. 709/224 |

FOREIGN PATENT DOCUMENTS

| | | |
|---|---|---|
| CN | 101977233 A | 2/2011 |
| WO | 0227552 A2 | 4/2002 |
| WO | 2007057006 A1 | 5/2007 |

OTHER PUBLICATIONS

Tracking.Net Product Page; TAGcelerate Website Acceleration Suite for ad and tracking tags; Product information Webpage, http://www.webcitation.org/5xM12PNNe; Mar. 21, 2011; pp. 1-3.

* cited by examiner

*Primary Examiner* — Le Luu
(74) *Attorney, Agent, or Firm* — Steven L. Nichols; Fabian VanCott (57) ABSTRACT

Web page scripts are managed in a network using a network appliance that intercepts a web page sent from a server and addressed to a client browser; modifies the web page by removing an embedded script from the web page; executes the removed embedded script; and sends the modified web page from the network appliance to the client browser.

19 Claims, 9 Drawing Sheets

```
<html>
<body>

<h1>Widget Research Institute</h1>

<p>At Widget Research Institute, we pride ourselves on
our top notch research services.</p>

<script type="text/javascript" src="http://
www.analytics.example/stats/analytics.js"></script>

</body>
</html>
```

*Fig. 3A*

```
<html>
<body>

<h1>Widget Research Institute</h1>

<p>At Widget Research Institute, we pride ourselves on
our top notch research services.</p>

</body>
</html>
```

*Fig. 3B*

```
<html>
<body>

<h1>Widget Research Institute</h1>

<p>At Widget Research Institute, we pride ourselves on
our top notch research services.</p>

<script type="text/javascript" src="http://
www.replacement.example/new.js"></script>

</body>
</html>
```

WEB PAGE SCRIPT MANAGEMENT

BACKGROUND

The present specification relates to the management of embedded scripts in web pages. More specifically, the present specification relates to the management of network traffic by controlling the execution of embedded scripts in web pages.

Many organizations use web analytics services to track the ways in which consumers interact with their websites and other online tools. Web analytics services typically record information provided by web browsers that retrieve web pages. For example, a web analytics service may collect statistical information about the browser type, geographic location, number of visits, and length of visits associated with individual visitors to a certain web page. This statistical information may be presented to the owner of the web page, who may modify or otherwise optimize the web page based on the statistical information to achieve objectives in place for that web page.

In a typical web analytics scenario, the hypertext markup language (HTML) file for a web page may include an embedded script generated by a web analytics service. When a visitor retrieves the web page, his or her browser executes the embedded script, causing the browser to provide certain information about the visitor to a server associated with the web analytics service. For example, an embedded script may cause the browser to compile the information about the visitor, encode the information into a file name according to a predetermined syntax, and request a file having that file name from the server associated with the web analytics service. Unfortunately, the code from the embedded script may be substantially large when compared to the size of the web page. For this reason, the use of embedded analytics scripts in web pages may noticeably delay web page retrieval in slow or congested networks. Moreover, the retrieval and execution of embedded scripts may be inconvenient or costly to visitors accessing the web page through networks with bandwidth-restrictive networks.

BRIEF SUMMARY

A machine-implemented method of web page script management includes: in a network appliance implemented by at least one processor, intercepting a web page sent from a server and addressed to a client browser; modifying the web page with the network appliance by removing an embedded script from the web page; executing the removed embedded script with the network appliance; and sending the modified web page from the network appliance to the client browser.

A machine-implemented method of web page script management includes: in a network appliance implemented by at least one processor, intercepting a number of packets sent from a server and addressed to a client browser; determining with the network appliance that a number of packets received in the network appliance include a web page having a first embedded script; modifying at least one of the packets with the network appliance to replace the embedded script from the web page with a second embedded script; forwarding the packets as modified by the network appliance to the client browser; and executing the first embedded script with the network appliance in response to receiving an indication that the client browser has executed the second embedded script.

An apparatus includes at least one processor and a memory communicatively coupled to the at least one processor. The memory stores executable code that, when executed by the at least one processor, causes the at least one processor to implement a network appliance by: intercepting a web page sent from a server and addressed to a client browser; modifying the web page by removing an embedded script from the web page; executing the removed embedded script; and sending the modified web page to the client browser.

A system includes a client device implemented by at least a first processor, a network appliance device implemented by at least a second processor, and a network communicatively coupling the network appliance device to the client device. The network appliance device intercepts a web page sent by a server and addressed to the client device, modifies the web page by removing an embedded script from the web page, executes the removed embedded script, and sends the modified web page to the client device over the network.

A computer program product for web page script management includes a tangible computer readable storage medium having computer readable program code embodied therewith. The computer readable program code includes computer readable program code configured to intercept a web page sent from a server and addressed to a client browser, computer readable program code configured to modify the web page by removing an embedded script from the web page, computer readable program code configured to execute the removed embedded script, and computer readable program code configured to send the modified web page to the client browser.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

The present specification discloses methods, systems, apparatus, and computer program products for managing the execution of scripts, such as web analytics scripts, embedded in web pages. According to the principles of the present specification, a network appliance disposed between a client browser and a server may intercept a web page sent by the server to the client browser. The network appliance may remove an embedded script from the intercepted web page, execute the removed embedded script on its own, and transmitting the web page to the client browser without the embedded script. In this way, the bandwidth and processing resources used by the client browser to download and render the web page may be reduced without sacrificing the execution of the embedded script.

As used in the present specification and in the appended claims, the term "browser" refers to a software application executed by a hardware device for retrieving, presenting, and traversing information on a network, such as the Internet.

As used in the present specification and in the appended claims, the term "network appliance" refers to an autonomous machine communicatively coupled to a network.

As used in the present specification and in the appended claims, the term "script" refers to a sequence of machine-readable instructions. The term "embedded script" refers to a script that is included or incorporated by reference into a markup language description of a web page and executable by a browser rendering that web page. Examples of "embedded scripts" as defined herein include, but are not limited to, scripts conforming to the JavaScript standard that are incorporated into hypertext markup language (HTML) files for specific web pages.

As used in the present specification and in the appended claims, the term "web page" refers to a document written in a markup language that can be retrieved and rendered by a browser.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
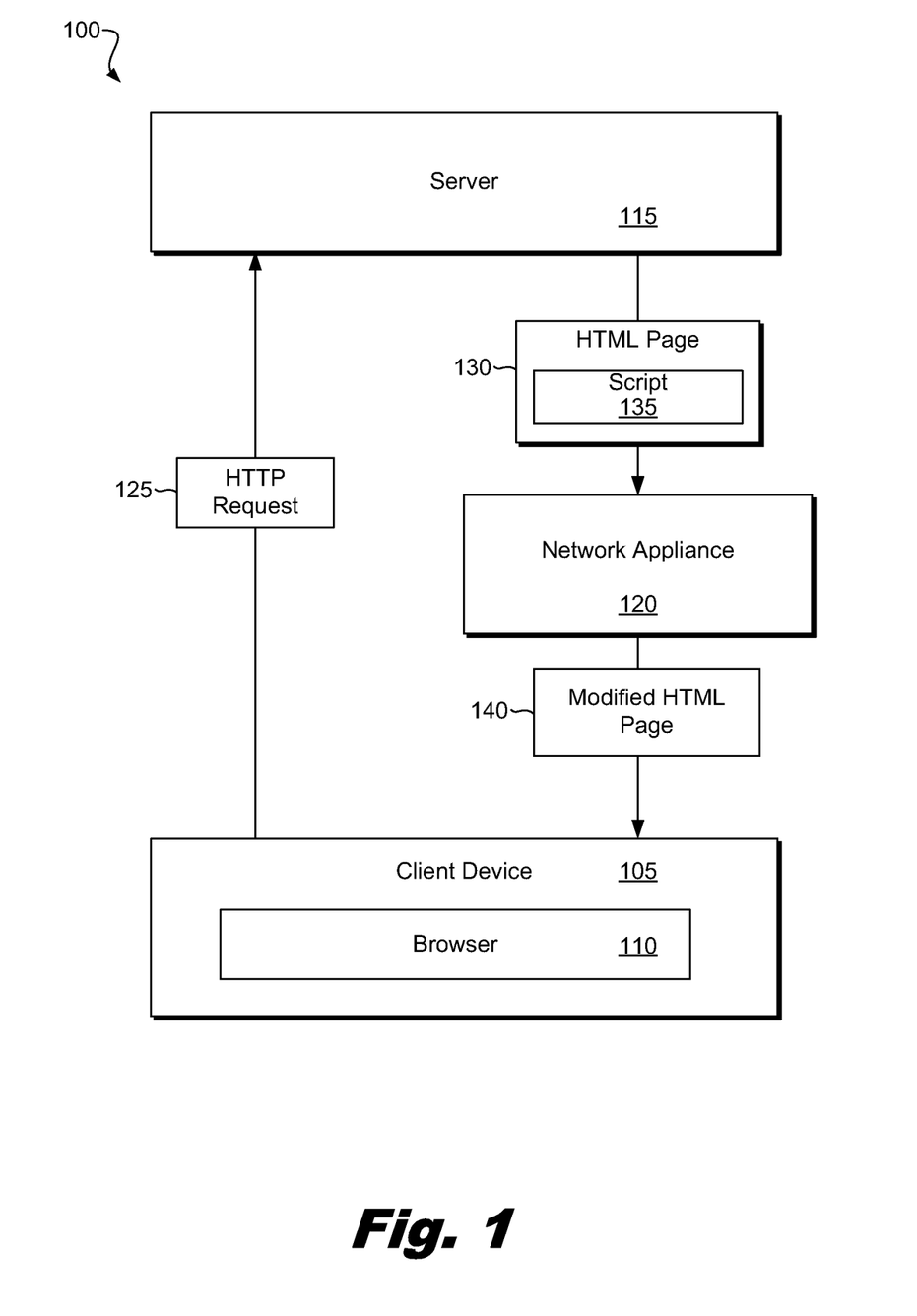
FIG. 1 is a block diagram of an illustrative system for web page script management according to one example of principles described herein.

With reference now to the Figures, FIG. 1 is a block diagram of an illustrative system (100) that may be used to manage the execution of embedded scripts in web pages. As shown in FIG. 1, the system (100) includes a client device (105) implementing a browser (110), a server (115), and a network appliance (120) disposed between the server (115) and the client device (105) in the path of communications from the server (115) to the client device (105). In certain examples, the network appliance (120) may also be disposed between the server (115) and the client device (105) in the path of communications from the client device (105) to the server (115). For example, in certain examples the network appliance (120) may function as a proxy server that acts as an intermediate in all network communications between the client device (105) and external servers (115).

In certain examples, the server (115) may be a web server that has access to one or more stored web pages, receives requests for the stored web pages, and responds to the requests by transmitting copies of the requested web pages to the requesting parties. For example, the browser (110) of the client device (105) may communicate a hypertext transfer protocol (HTTP) request (125) for a certain web page over a network connection to the server (115). In response to receiving the request (125), the server (115) may send a copy of the requested web page (130) over the network addressed to the browser (110) of the client device (105). The web page (130) may include an embedded script (135), such as an embedded JavaScript with instructions for providing statistical information to an external web analytics service.

The network appliance (120) may intercept the web page (130) sent by the server (115) prior to delivery of the web page (130) to the client device (105). In certain examples, the network appliance (120) may analyze the content of intercepted network packets to determine their source, destination, and whether they are part of a web page (130) having an embedded script (135). This analysis may include the performance of deep packet inspection (DPI) on the intercepted network packets. The network appliance (120) may modify the web page (130) transmitted by the server (115) by removing or replacing the script (135) embedded within the web page (130). In certain examples, only scripts (135) that meet one or more predefined criterion may be removed from the web page (130) or replaced by the network appliance (120). Additionally or alternatively, different criteria may be used by the network appliance (120) to determine whether an embedded script (135) should be removed, replaced, or left alone in the web page.

In the event that the network appliance (120) removes or replaces the embedded script (135), the network appliance (120) transmits a modified version of the web page (140) to the browser (110) of the client device (105). The modified version of the web page (140) may include the original content of the web page (130) transmitted by the server (115), with the original embedded script (135) removed and/or replaced with a second script generated by the network appliance (120).

Executing the embedded script (135) at the network appliance (120) instead of at the browser (110) of the client device (105) poses significant advantages over prior solutions. For example, the size (i.e., number of bytes) of the modified web page (140) received by the client device (105) may be significantly less than the size of the web page (130) originally intended for the client device (105). This reduced size may be particularly advantageous in examples where network bandwidth of the client device (105) is metered and/or billed according to consumption, or where the network connection of the client device (105) is slow. Furthermore, because the browser (110) of the client device (105) does not process the embedded script (135) processing resources of the client device (105) may be conserved. Moreover, application latency of the browser (110) of the client device (105) may be improved.

In addition to the above features described with respect to the client device (105), the present system may also provide significant advantages to the source of the embedded script (135). Take, for instance, the example of an embedded script (135) with instructions to gather analytical data about the client device and encode the analytical data to an external server in the form of a request for a file. When such a script (135) is executed by a web browser (110), the type and amount of analytical data that the browser (110) may access and transmit to the external server may be limited by protocol. By contrast, the network appliance (120) may have access to additional information about the user of the client device. For instance, the network appliance (120) may be associated with the internet service provider for the client device (105), and accordingly may have access to information about the demographics and location of a user of the browser (110) that may not be available to the browser (110). In this scenario, and with the user's permission, the external server may receive more useful analytical data if the network appliance (120) executes the embedded script (135) than if the browser (110) of the client device (105) executes the embedded script (135).

Figure 2:
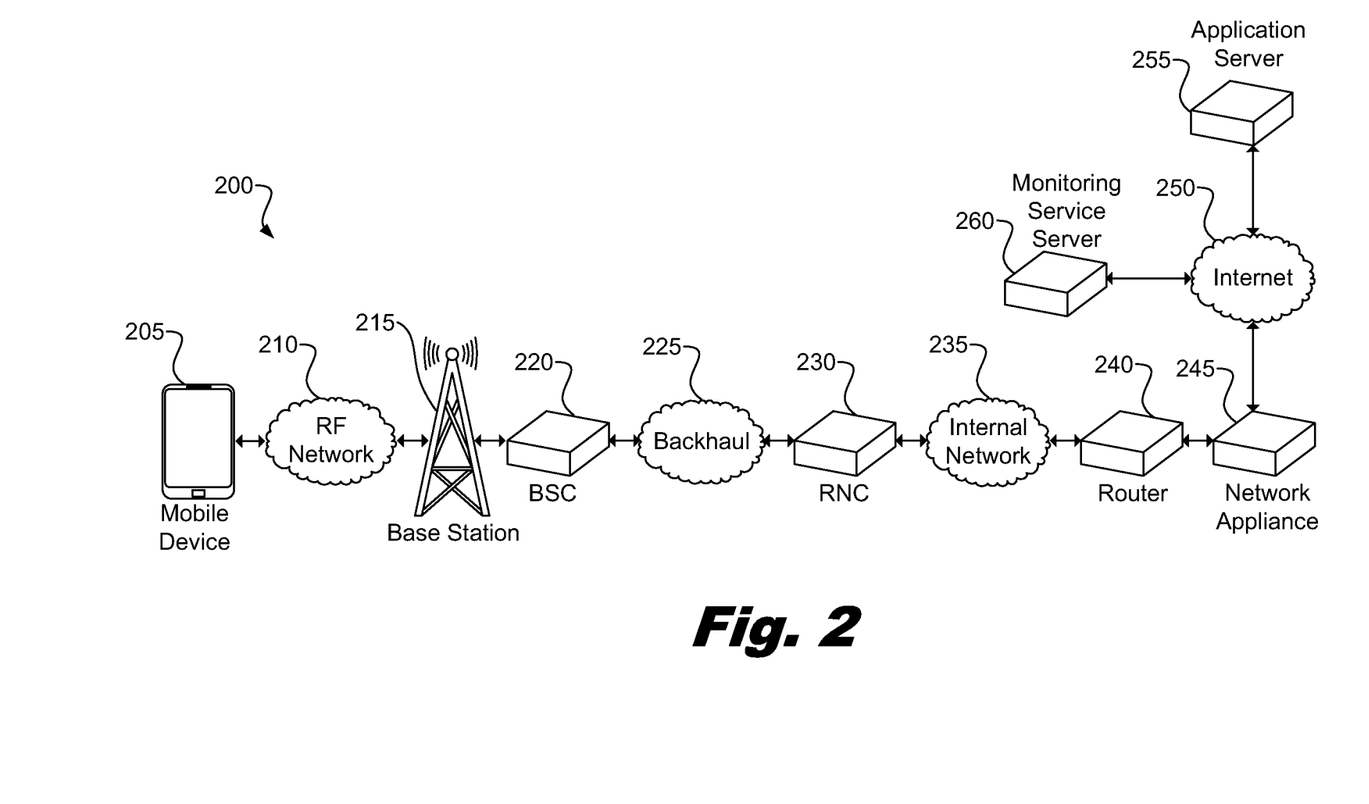
FIG. 2 is a diagram of an illustrative system for web page script management according to one example of principles described herein.

FIG. 2 is a diagram of an illustrative system (200) for managing the execution of embedded scripts, according to the principles described above with respect to FIG. 1. The system (200) includes a mobile device (205) connected to a base station (215) via a radio network (210) (e.g., a Code Division Multiple Access (CDMA) network or a Global System for Mobile Communications/Groupe Special Mobile (GSM) network). Depending on the network access plan of the mobile device (205), network usage by the mobile device (205) may be subject to limitations, such as data caps, bandwidth metering, consumption-based billing, and the like. Accordingly, it may be advantageous to a user or owner of the mobile device (205) to reduce or control the bandwidth consumed by the mobile device (205).

The base station (215) may be managed by and communicatively coupled to a base station controller (220), also known as a base station subsystem, which handles traffic and signaling between mobile devices and the base station (215). The base station controller (220) may be communicatively coupled through a backhaul infrastructure (225) to a radio network controller (230), which manages the use of radio resources and encryption for communications with mobile devices. The radio network controller (230) may be communicatively coupled through an internal network (235) to a router (240) which manages communication to and from an external network, such as the internet (250).

In the present example, a network appliance (245) may be disposed between the router (240) and the internet (250). In certain examples, the network appliance (245) may function as a proxy server. The network appliance (245) may perform deep packet inspection (DPI) analysis on packets received over the internet (250) that are addressed to the mobile device (205). This analysis may allow the network appliance (245) to detect web pages addressed to the mobile device (205) from, for example, an external application server (255). If a web page addressed to the mobile device (205) is detected from the packets received at the network appliance (245), the network appliance (245) may determine whether the web page includes an embedded script that is a candidate for removal and/or replacement by the network appliance (245). In certain examples, only embedded scripts matching at least one predefined criterion (e.g., analytics scripts) may be candidates for removal and/or replacement. Alternatively, all detected embedded scripts in web pages may be candidates for removal or replacement. Additionally or alternatively, certain types of embedded scripts may be candidates for removal, and other types of embedded scripts may be candidates for replacement.

Once a web page has been modified such that the qualifying embedded script(s) have been removed or replaced, the modified web page is sent from the network appliance (245) to the mobile device (205). Typically, if a first embedded script is removed from the web page and replaced with a second embedded script, the second embedded script may be smaller in size than the first embedded script. The second embedded script, upon execution by a browser in the mobile device (205), may cause the mobile device (205) to send a message to the network appliance (245) which triggers the network appliance (245) to execute the first embedded script. Alternatively, the network appliance (245) may execute the first embedded script without a trigger signal. As a result of executing the first embedded script, the network appliance (245) may provide analytics information to an external analytics server (260) over the internet (250). As described previously, the analytics information provided by the network appliance (245) may be of broader scope than a browser of the mobile device (205) is capable of providing.

Figure 3A:
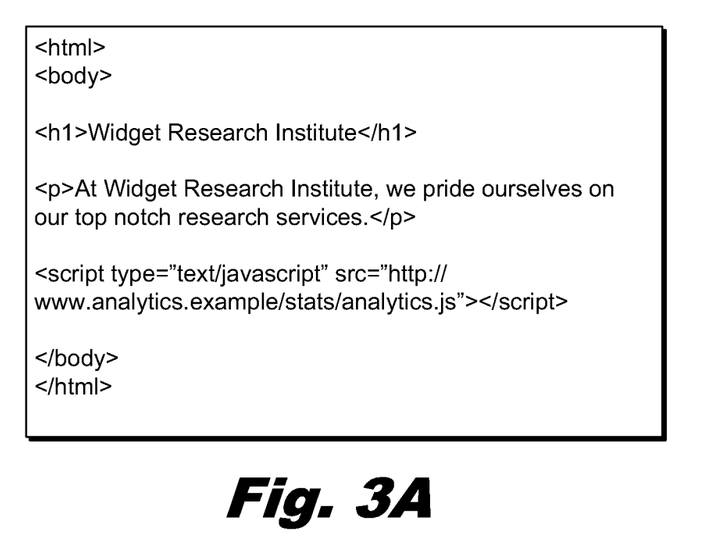
FIGS. 3A, 3B, and 3C show illustrative HTML code for web pages at various stages of illustrative methods for web page script management, according to examples of principles described herein.
Figure 3B:
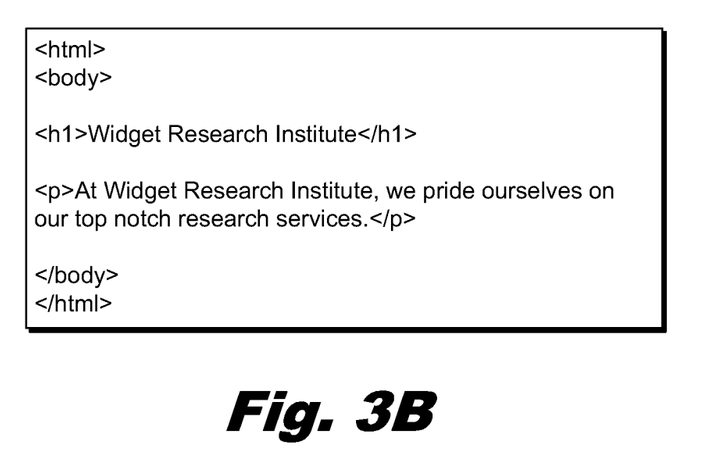
Figure 3C:
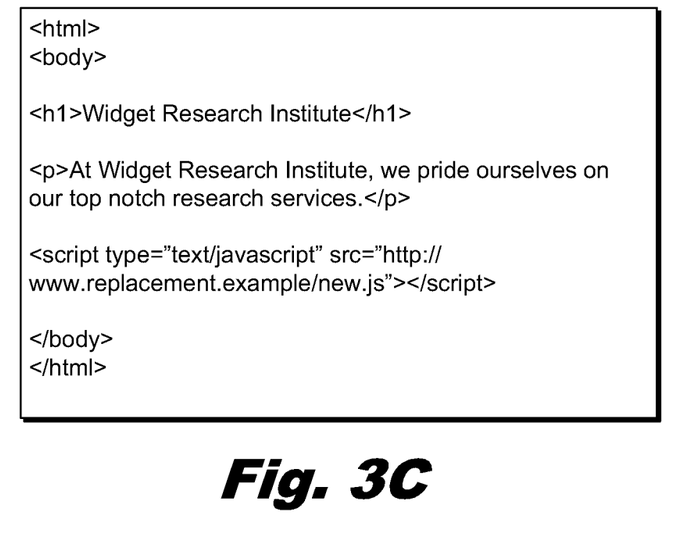

FIGS. 3A-3C show examples of an illustrative HTML web pages at different stages during the process described in FIGS. 1-2. FIG. 3A shows the code for the web page as it is originally sent from the server hosting the web page to a client device. As shown in FIG. 3A, the web page in its original form embeds a pointer to a JavaScript hosted by an analytics web server. If the web page were not intercepted and modified during the transmission between the server hosting the web page and the client device, a browser on the client device would render the web page, download the referenced script, and execute the referenced script. FIG. 3B shows one example of how the web page may be modified by a network appliance, such as network appliance (120) of FIG. 1 or network appliance (245) of FIG. 2. In this example, the embedded script has been removed from the web page entirely. FIG. 3C shows another example of how the web page may be modified by a network appliance. In this example, the embedded script has been replaced with a new embedded script supplied by the network appliance. The embedded script from the network appliance may be a very lightweight script that simply triggers the network appliance to execute the original script embedded in the web page (i.e., the embedded script shown in FIG. 3A).

Figure 4:
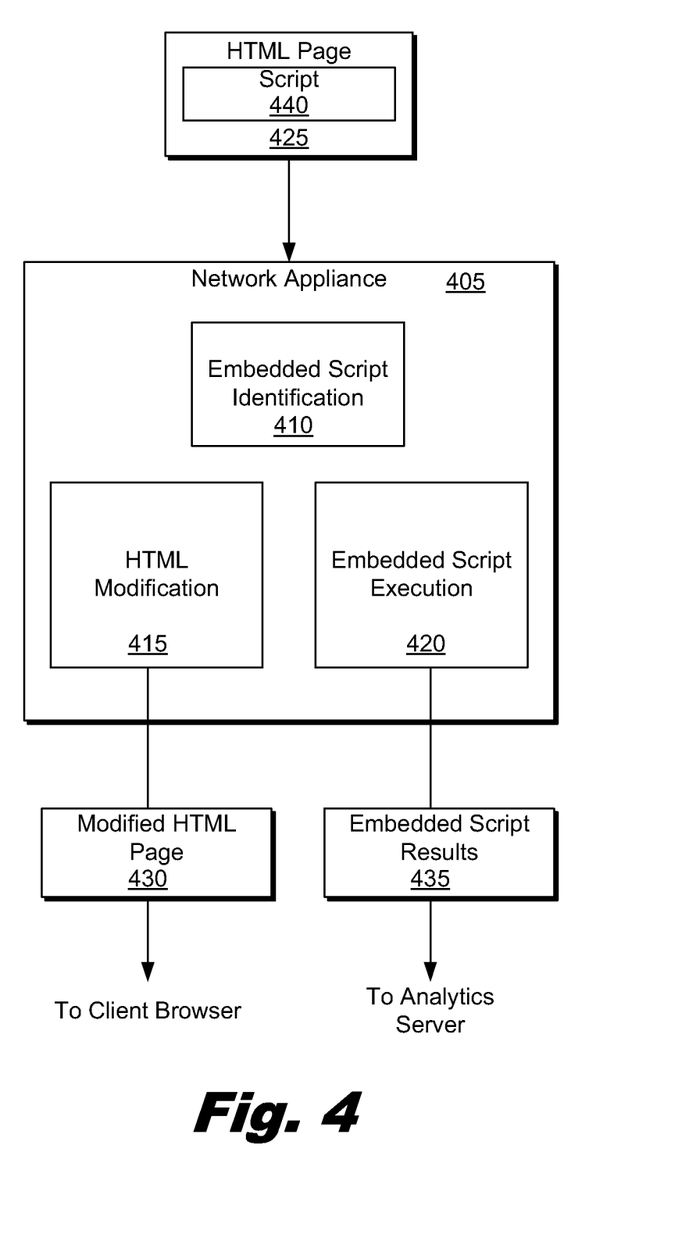
FIG. 4 is a block diagram of an illustrative network appliance according to one example of principles described herein.

FIG. 4 is a block diagram of an illustrative network appliance (405), according to the principles described in relation to FIGS. 1-3 previously. The network appliance (405) of the present example includes an embedded script identification module (410), an HTML modification module (415), and an embedded script execution module (420). The network appliance (405) accepts a number of packets making up an HTML web page (425) as input, and produces a modified version of the HTML web page (430) and embedded script results (435) as output.

The embedded script identification module (410) may perform deep packet inspection (DPI) on packets intercepted by the network appliance (405) to identify the web page (425) and determine whether the web page (425) includes an embedded script (440). In examples where only certain types of embedded scripts (440) are removed or replaced by the network appliance (405), the embedded script identification module (410) may also determine whether any embedded scripts (440) in the web page (425) meet the criteria for removal or replacement.

The HTML modification module (415) modifies the packets carrying the intercepted web page (425) to remove or replace any selected embedded script. The packets containing the modified version of the web page (430) may then be sent to the client browser to which the packets are addressed.

The embedded script execution module (420) may store and execute the script (440) originally embedded in the unmodified version of the web page (425). In certain examples, the embedded script execution module (420) may delay executing the original embedded script (440) until a trigger is received from the client browser (e.g., through the client browser executing a replacement embedded script). Alternatively, the embedded script execution module (420) may execute the original embedded script (440) immediately or at some other predetermined time. In the present example, executing the original embedded script (440) may include compiling client analytics data about the recipient of the web page (425) and transmitting the client analytics data as the embedded script results (435) to an external analytics server. As explained previously, the network appliance (405) may have access to a larger scope of client analytics data than a browser on the actual client device, so it may be beneficial to a third-party analytics service for the original embedded script (440) to be executed by the network appliance (405) instead of by the browser of the client device.

Figure 5:
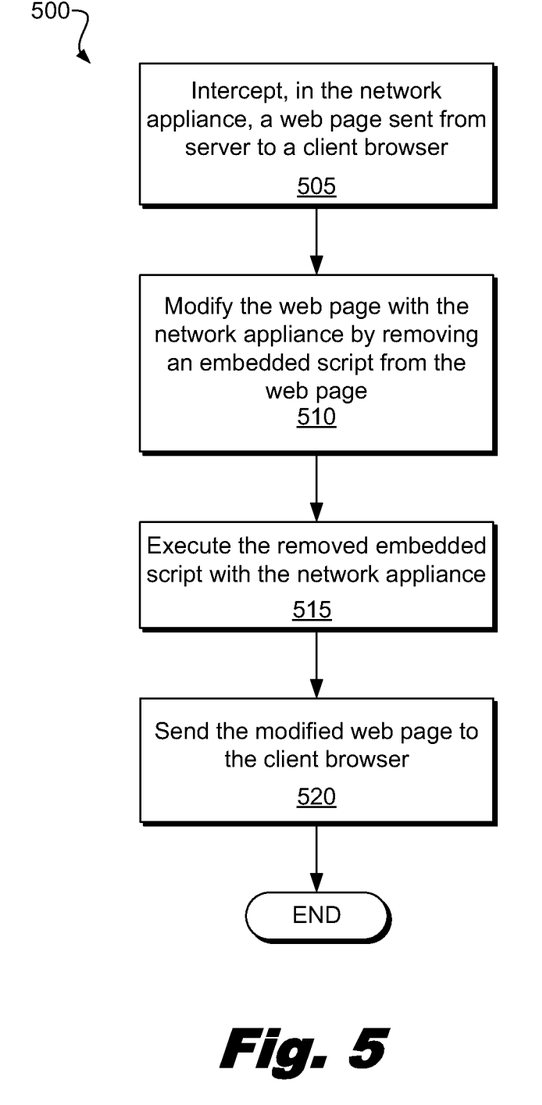
FIG. 5 is a flowchart diagram of an illustrative method of web page script management, according to one example of principles described herein.

FIG. 5 is a flowchart diagram of an illustrative computer-implemented method (500) of web page script management. The computer-implemented method (500) may be performed by a network appliance, such as any of the network appliances (120, 245, 405) described with regard to the previous Figures. The method (500) includes intercepting (block 505), in the network appliance, a web page sent from a server to a client browser. To intercept the web page, the network appliance may first detect the web page, together with any scripts embedded in the web page, by analyzing content from a number of packets (e.g., through the performance of deep packet inspection (DPI)) addressed to the client browser from the server. The web page is then modified (block 510) in the network appliance by removing an embedded script from the web page. To remove the embedded script from the web page, the network appliance may modify at least one of the intercepted packets addressed to the client browser from the server.

The network appliance may execute (block 515) the removed embedded script with the network appliance and send (block 520) the modified web page to the client browser. In certain examples, the removed embedded script may be executed (block 515) before or concurrent to sending (block 520) the modified web page to the client browser. In other examples, the modified web page may be sent (block 520) to the client browser prior to execution (block 515) of the removed embedded script by the network appliance. In certain examples, execution of the removed embedded script may involve the establishment of communication between the network appliance and an external server, for example, to transmit analytics information to the external server.

Figure 6:
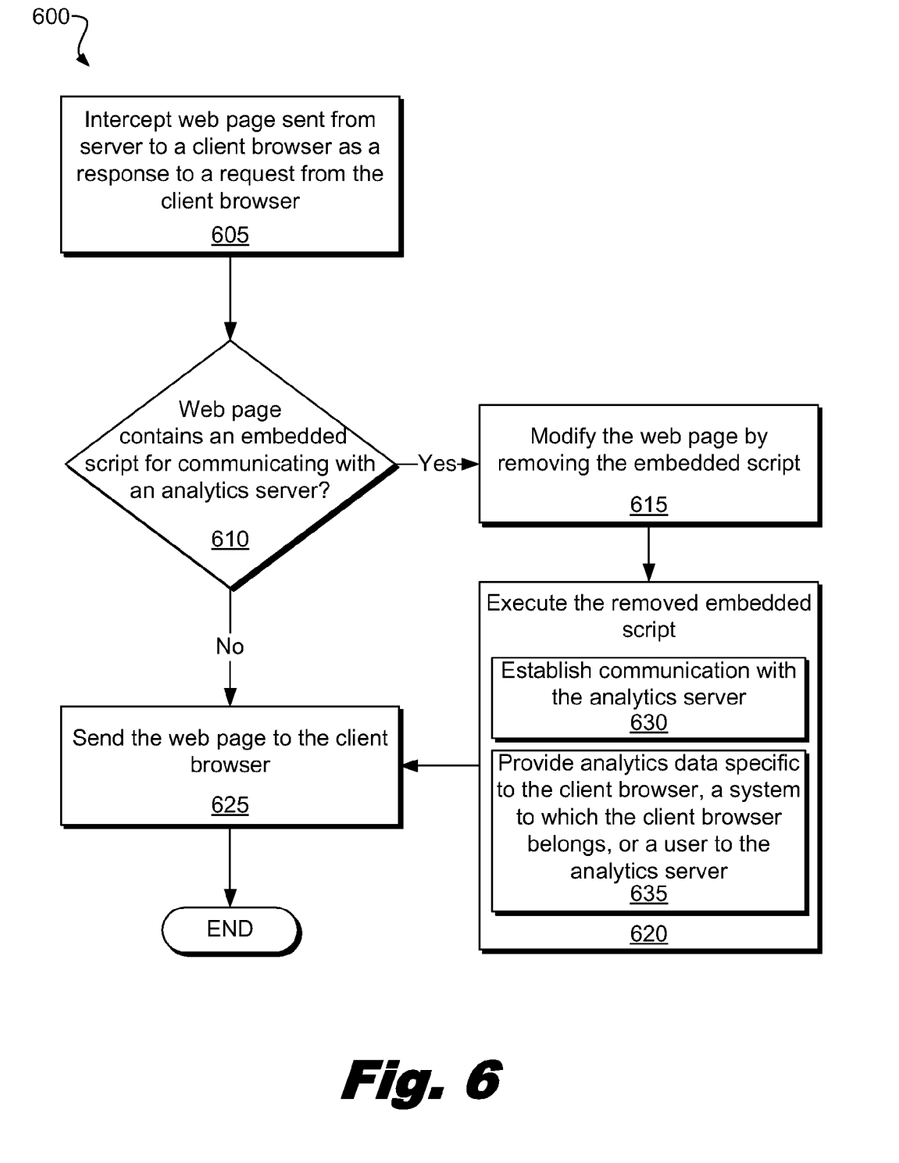
FIG. 6 is a flowchart diagram of an illustrative method of web page script management, according to one example of principles described herein.

FIG. 6 is a flowchart diagram of an illustrative computer-implemented method (500) of web page script management. The computer-implemented method (500) may be performed by a network appliance, such as any of the network appliances (120, 245, 405) described with regard to the previous Figures. The method (600) includes intercepting (block 605) a web page sent from a server to a client browser in response to a request for the web page from the client browser. The network appliance then determines (block 610)

whether the intercepted web page contains an embedded script for communicating with an analytics server. If no such embedded script is present in the web page (block 610, No), the web page is sent (block 625) to the client browser unchanged. On the other hand, if an embedded script for communicating with an analytics server is found in the web page (block 610, Yes), the web page is modified (block 615) by removing the embedded script, the removed embedded script is executed (block 620) by the network appliance, and the modified web page is sent (block 625) to the client browser.

The removed embedded script may be executed (block 620) by the network appliance either before or after sending (block 625) the modified web page to the client browser. Executing the removed embedded script may include establishing (block 630) communication with the analytics server. Through that communication, the network appliances provides (block 635) information specific to the client browser, a system to which the client browser belongs, and/or a user of the client browser. The information provided to the analytics server may be already stored and available to the network appliance. Alternatively, a portion of the analytics information provided to the analytics server may be obtained from the client browser before the network appliance sends the analytics information to the analytics server.

Figure 7:
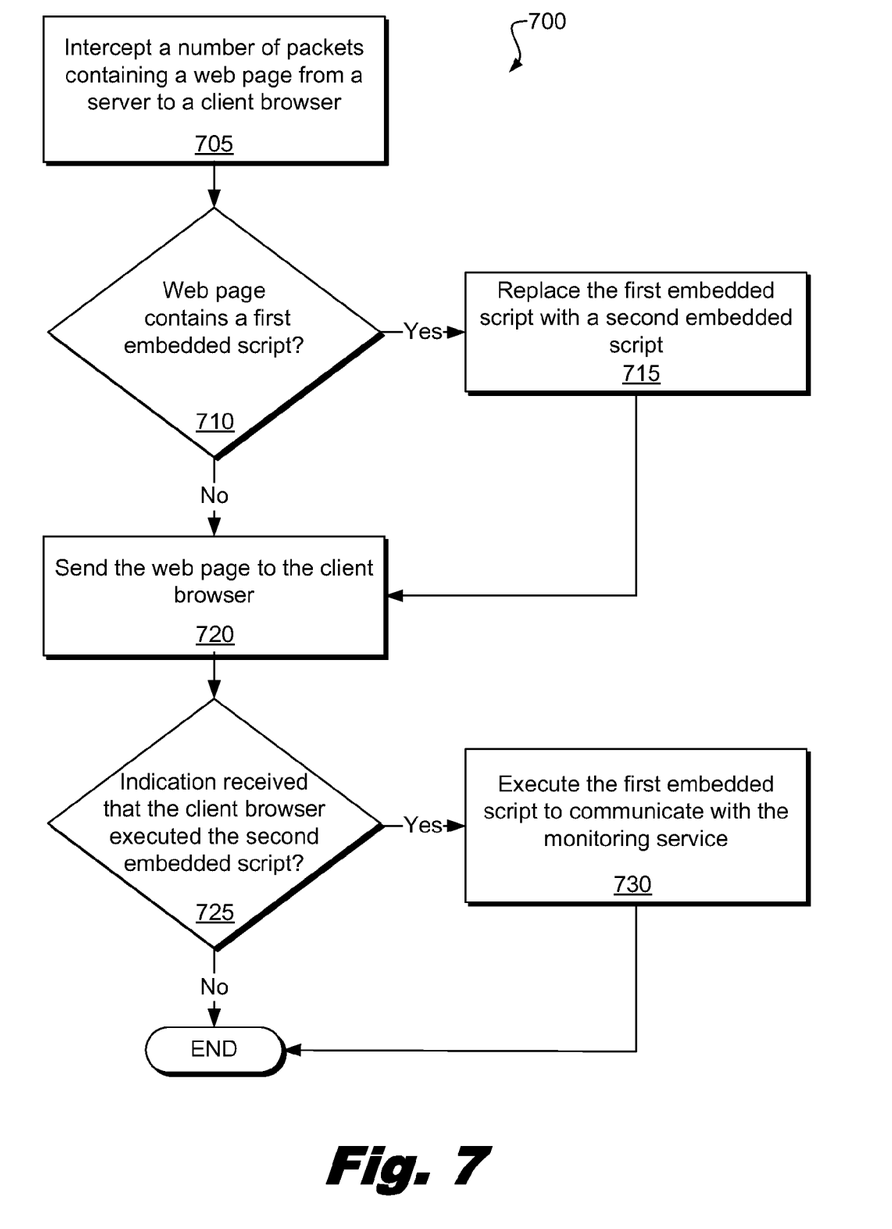
FIG. 7 is a flowchart diagram of an illustrative method of web page script management, according to one example of principles described herein.

FIG. 7 is a flowchart diagram of yet another illustrative computer-implemented method (700) of web page script management. The method (700) of FIG. 7 may also be performed by a network appliance, consistent with the principles described with regard to previous Figures. In this method (700), a number of packets containing a web page sent from a server to a client browser are intercepted (block 705). A determination is then made (block 710) as to whether the web page intercepted in the packets contains a first embedded script, such as a script for providing analytics information to a third-party analytics server. In certain examples, an additional determination will be made as to whether a found first embedded script meets one or more predefined selection criteria.

If the first embedded script is found within the web page (block 710, Yes), the first embedded script is replaced (block 715) with a second embedded script from the network appliance. In this particular example, the second embedded script is a lightweight script (i.e., smaller than the first embedded script) with instructions to provide an indication message to the network appliance. The modified web page may then be sent (block 720) to the client browser. If no first embedded script is found within the web page (block 710, No), no changes are made to the content of the web page, and the unchanged web page is sent (block 720) to the client browser.

After the web page has been sent (block 720) to the client browser, if an indication is received (block 725, Yes) from the client browser that the client browser executed the second embedded script, the network appliance may execute (block 730) the first embedded script, thereby ending the flow of the method (700). If no indication is received (block 725, No), the method (700) terminates.

In certain examples, the indication sent by the client browser may include substantive data. For example, the indication may include a key that can be queried in a database maintained by the network appliance to retrieve analytics information about the client browser or a user of the client browser that can be sent to a third-party analytics service from the network appliance as part of the execution of the first embedded script. In some examples, the key sent by the same client browser may vary according to the particular circumstances under which the client browser is operating. Additionally or alternatively, the indication may include at least a portion of the analytics information about the client browser that will be eventually transmitted to the analytics service by the network appliance upon execution of the first embedded script.

Figure 8:
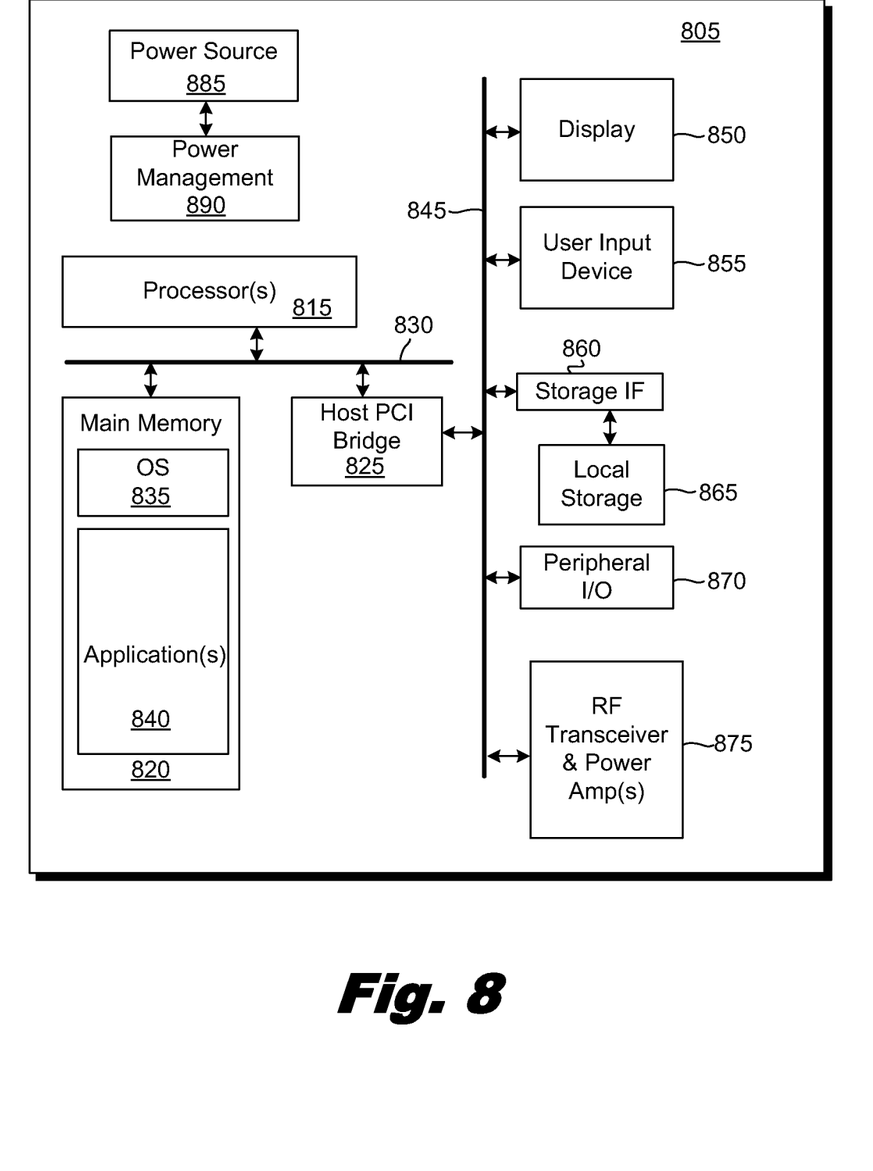
FIG. 8 is a block diagram of an illustrative computing device for use in a system of web page script management, according to one example of principles described herein.

FIG. 8 is a block diagram of an illustrative device (805) which may implement any of the devices or systems described in the examples of the previous Figures. For example, the illustrative device (805) may implement a server, a network appliance, or a client device consistent with the principles of the present specification. The device (805) may include at least one processor (815). The processor(s) (815) of the device (805) may include a single-core processor with a single Central Processing Unit (CPU) and/or a multi-core processor with multiple CPUs that share a common L2 cache and bus interface.

The processor(s) (815) may be communicatively coupled to main memory (820) and a host Peripheral Component Interconnect (PCI) bridge (825) through a main bus (830). The main memory (820) may include one or more tangible computer readable storage media. The tangible computer readable storage media store machine-readable instructions which are executed by the processor(s) (815) to implement an operating system (835) and one or more applications (840) causing the device (805) to perform a particular functionality. For example, if the device (805) is implementing a network appliance as described in the present specification, the main memory (820) may include an application for intercepting a web page sent from a server and addressed to a client browser; modifying the web page by removing an embedded script from the web page; executing the removed embedded script; and sending the modified web page to the client browser.

The PCI bridge (825) provides an interface between the main bus (830) and a PCI bus (845) connected to peripheral hardware components. The peripheral hardware components may include one or more of: a display device (850), a user input device (855), a storage interface (860) to local storage (865), other peripheral input/output interfaces (870), and an RF transceiver and power amplifier(s) (875) for wireless network communications. Electrical power may be provided to the components of the device (805) from a power source (885), such as a battery or DC power supply, and regulated via a power management chip (890).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. An apparatus, comprising:
   at least one processor;
   a memory communicatively coupled to the at least one processor, the memory storing executable code that, when executed by the at least one processor, causes the at least one processor to implement a network appliance by:
      intercepting a web page sent from a server and addressed to a client browser;
      modifying the web page by removing an embedded script from the web page;
      executing, by the network appliance, the removed embedded script; and
      sending the modified web page to the client browser.

2. The apparatus of claim 1, the executable code further causing the at least one processor to detect the web page and the embedded script by analyzing content from a number of packets addressed to the client browser from the server.

3. The apparatus of claim 2, in which modifying the web page comprises modifying the number of packets addressed to the client browser from the server.

4. The apparatus of claim 1, in which executing the removed embedded script with the network appliance comprises establishing communication between the network appliance and a second server.

5. The apparatus of claim 1, in which modifying the web page with the network appliance comprises replacing the removed embedded script with a second embedded script.

6. The apparatus of claim 1, in which the removed embedded script comprises a web analytics script.

7. The apparatus of claim 6, in which the web analytics script is configured to cause the client browser to provide information about a user to a web analytics service.

8. The apparatus of claim 6, in which the web analytics script comprises instructions to provide statistical information about a user to an external web analytics service.

9. The apparatus of claim 1, in which executing the removed embedded script by the network appliance comprises accessing demographic and location information of a user requesting the web page.

10. A system, comprising:
    a client device implemented by at least a first processor;
    a network appliance device implemented by at least a second processor; and
    a network communicatively coupling the network appliance device to the client device;
    in which the network appliance device is configured to intercept a web page sent by a server and addressed to the client device, modify the web page by removing an embedded script from the web page, execute the removed embedded script, and send the modified web page to the client device over the network.

11. The system of claim 10, further comprising a router communicatively coupled to the network appliance device.

12. The system of claim 11, in which all network traffic addressed to the client device and received at the router is routed to the client device by way of the network appliance device.

13. The system of claim 11, in which the network appliance device monitors network traffic addressed to the client device and routed by the router to detect any said web page comprising a said embedded script.

14. The system of claim 10, in which executing the embedded script comprises establishing network communication between the network appliance device and a second server.

15. The system of claim 14, in which the second server is associated with a web analytics service.

16. The system of claim 14, in which executing the embedded script further comprises sending the second server information about at least one of: the client device and a user of the client device.

17. The system of claim 14, in which modifying the web page with the network appliance device comprises replacing the removed embedded script with a second embedded script.

18. The system of claim 17, in which the second embedded script is smaller than the removed embedded script and the second embedded script configured to send a message to the network appliance device to execute the removed embedded script.

19. A computer program product for web page script management, the computer program product comprising:
    a non-transitory computer readable medium having computer readable program code embodied therewith, the computer readable program code comprising:
    computer readable program code configured to intercept a web page sent from a server and addressed to a client browser;
    computer readable program code configured to modify the web page by removing an embedded script from the web page;
    computer readable program code configured to execute the removed embedded script outside of the client browser; and
    computer readable program code configured to send the modified web page to the client browser.

* * * * *

(12) INTER PARTES REVIEW CERTIFICATE (3770th)

United States Patent
Burckart et al.

(10) Number: US 9,503,498 K1
(45) Certificate Issued: Oct. 18, 2024

(54) WEB PAGE SCRIPT MANAGEMENT

(75) Inventors: Erik John Burckart; Robert Madey, Jr.; Victor S. Moore; Joseph Wham Ziskin

(73) Assignee: OXYLABS, UAB

Trial Number:

IPR2023-00185 filed Nov. 15, 2022

Inter Partes Review Certificate for:

Patent No.: 9,503,498
Issued: Nov. 22, 2016
Appl. No.: 13/248,615
Filed: Sep. 29, 2011

The results of IPR2023-00185 are reflected in this inter partes review certificate under 35 U.S.C. 318(b).

INTER PARTES REVIEW CERTIFICATE
U.S. Patent 9,503,498 K1
Trial No. IPR2023-00185
Certificate Issued Oct. 18, 2024

AS A RESULT OF THE INTER PARTES REVIEW PROCEEDING, IT HAS BEEN DETERMINED THAT:

Claims 1-19 are found patentable.

\* \* \* \* \*